United States Patent [19]

Mohlenkamp, Jr et al.

[11] 4,243,691

[45] Jan. 6, 1981

[54] SODIUM-FREE SALT SUBSTITUTE

[75] Inventors: Marvin J. Mohlenkamp, Jr, Cincinnati; George D. Hiler, Harrison Township, Montgomery County, both of Ohio

[73] Assignee: The Procter & Gamble Company, Cincinnati, Ohio

[21] Appl. No.: 40,353

[22] Filed: May 18, 1979

[51] Int. Cl.$^3$ ............................................. A23L 1/237
[52] U.S. Cl. ...................................... 426/649; 426/537
[58] Field of Search ............................... 426/537, 649

[56] References Cited

U.S. PATENT DOCUMENTS

| | | | |
|---|---|---|---|
| 2,742,366 | 4/1956 | Power | 426/649 |
| 3,104,171 | 9/1963 | Sakaguchi et al. | 426/537 X |
| 3,306,753 | 2/1967 | Norsen | 426/649 |
| 3,447,932 | 6/1969 | Olson et al. | 426/646 |
| 3,505,082 | 4/1970 | Miller | 426/649 |
| 3,514,296 | 5/1970 | Frank et al. | 426/649 |
| 3,524,747 | 8/1970 | O'Hara et al. | 426/537 |
| 3,775,543 | 11/1973 | Zyss | 426/646 |
| 3,782,974 | 1/1974 | Lantz et al. | 426/649 |
| 3,860,732 | 1/1975 | Eisenstadt | 426/649 |
| 4,066,793 | 1/1978 | Eguchi | 426/650 X |
| 4,066,799 | 1/1978 | Cornelius et al. | 426/649 X |
| 4,068,006 | 1/1978 | Moritz | 426/649 X |

FOREIGN PATENT DOCUMENTS 1517137 3/1973 Fed. Rep. of Germany .
1275540 5/1972 United Kingdom .

Primary Examiner—Joseph M. Golian
Attorney, Agent, or Firm—Eric W. Guttag; Rose Ann Dabek; Richard C. Witte

[57] ABSTRACT

A substantially sodium-free salt substitute containing 5'-nucleotides such as 5'-inosinic acid or its physiologically acceptable nonsodium salts, and 5'-guanosinic acid or its physiologically acceptable nonsodium salts, an amino acid mixture such as a nonsodium containing hydrolyzed vegetable protein, a sugar such as glucose, a potassium phosphate such as dipotassium orthophosphate, a potassium chloride, is disclosed. The salt substitute has an enhanced salty flavor even though the amount of potassium chloride is no more than 50% by weight. The salt substitute has further desirable gustatory flavors.

18 Claims, No Drawings

SODIUM-FREE SALT SUBSTITUTE

TECHNICAL FIELD

The present invention relates to flavor-enhancing materials. In particular, the present invention relates to a substantially sodium-free salt substitute.

BACKGROUND ART

There has been concern in recent years about the effect of excessive dietary sodium ion intake. Excessive sodium ion intake is believed to be the cause of certain deleterious health problems such as hypertension. Moreover, the accumulation of sodium ions in the body tends to cause an accumulation of fluids, with a corresponding increase in weight, by the body tissues. See Col. 1 of U.S. Pat. No. 3,505,082 to Miller issued Apr. 7, 1970, and *Food Product Development*, Vol. 13, No. 1, page 24, (January 1979).

The primary source of sodium ions in the diet is sodium chloride, i.e. common or table salt, which enters the diet via three pathways: (1) food naturally containing sodium chloride, (2) processed foods to which sodium chloride and other sodium salts are added, and (3) food to which sodium chloride is added by the individual during cooking or just prior to eating. The last two pathways have posed the greatest problem of excessive sodium ion intake in the diet.

Significant attention has been directed to ways to remove sodium chloride from the diet, including removal from processed foods. See U.S. Pat. No. 3,775,543 to Zyss, issued Nov. 27, 1973 which discloses a solubilizing and binding agent composition selected from potassium orthophosphate, polyphosphate, and pyrophosphate and mixtures thereof to replace sodium chloride and sodium phosphate in processed meat products. See also U.S. Pat. No. 3,447,932 to Olson et al., issued June 3, 1969 which discloses potassium chloride in combination with nonsodium polyphosphates and phosphates as substitute meat protein solubilizing agents for processed meats.

However, the removal of sodium chloride from the human diet poses difficult problems. The "saltiness" associated with sodium chloride is a particularly important flavor characteristic in many kinds of foods. Foods which do not have a salty taste have been described variously as "bland", "flat", or "tasteless". Therefore, the absence of salty flavor in the foods results in a much less pleasurable eating experience for those persons on sodium-restricted diets.

Various compositions have been used as salt substitutes. Among the most popular of these substitutes are ammonium chloride, potassium chloride and mixtures thereof used alone or with other additives. However, these salt substitutes suffer from the drawbacks of off-taste or bitter flavor, additional deleterious effects on health in the case of ammonium chloride, and a salty impression much less than that of sodium chloride.

Compositions containing large amounts of potassium chloride, in particular, have a bitter taste. Several attempts have been made to overcome the bitterness of salt substitutes containing potassium chloride. One attempt has been preparation of compositions generally characterized as sodium-free salt substitutes which utilize a masking agent to suppress the bitterness. See U.S. Pat. No. 3,505,082 to Miller, issued Apr. 7, 1970, which discloses a composition comprising 80–99% by weight of potassium chloride and from 1 to 20% by weight of fumaric acid, and which also discloses other masking agents such as potassium and calcium formate, magnesium citrate, dipotassium succinate and a variety of citrates, tartrates, gluconates, ascorbates, cyclamates, glutamates, and ion exchange resins. See also British Pat. No. 1,275,540, published May 24, 1972, which discloses a composition of potassium chloride or mixtures of potassium chloride and ammonium chloride, cream of tartar and either lactose or dextrose. The salt substitutes which employ masking agents generally contain a high percentage by weight of potassium chloride.

A second group of salt substitutes comprise potassium chloride which has been replaced by a quantity of sodium chloride, sometimes quite large, with or without an additional masking agent. See U.S. Pat. No. 3,514,296 to Frank et al., issued May 26, 1970 which discloses a salt substitute comprising 20% to 80% potassium chloride and 80% to 20% sodium chloride. See also U.S. Pat. No. 4,068,006 to Moritz issued Jan. 10, 1978, which discloses a salt substitute comprising potassium chloride, as much as 65% by weight sodium chloride and 0.5% to 1.5% by weight citric acid. In spite of these attempts to provide a suitable salt substitute containing potassium chloride, there still remains a need for a good non-sodium salt substitute to flavor foodstuffs.

It is therefore an object of the present invention to provide a salt substitute which is substantially free of sodium.

It is a further object of the present invention to provide a salt substitute utilizing less than 50% potassium chloride by weight, yet having a pleasing salty flavor.

It is yet a further object of the present invention to provide a salt substitute having desirable positive flavor characteristics in addition to a salty flavor.

These and other objects of the present invention are described hereinafter.

DISCLOSURE OF THE INVENTION

The present application discloses a novel, edible, substantially sodium-free salt substitute. The salt substitute generally comprises a 5'-nucleotide component, an amino acid mixture, a sugar component, a potassium phosphate component and potassium chloride. The salt substitute has a salty taste without the bitter off-flavor which usually accompanies the use of potassium chloride. The combination of ingredients enhances the salty impression of the potassium chloride, therefore reducing the amount of potassium chloride necessary to obtain the saltiness desired for various foodstuffs, i.e. no more than 50% by weight potassium chloride is necessary. Moreover, the salt substitute of the present invention provides additional gustatory flavor impressions beside saltiness which add to its desirability.

Salt substitutes of the present invention can comprise, consist essentially of or consist of the ingredients set forth. The salt substitute can be added to a wide variety of foodstuffs in a flavor-enhancing amount and are particularly desirable for enhancing such foodstuffs as soups, stews, vegetables or mashed potatoes.

The use of the individual ingredients of the present invention in flavoring materials, especially meat flavors, is well known. For example, it is known that a combination of extracts of yeast autolysates, 5'-nucleotides, sodium chloride (5% to 20% by weight), a potassium salt such as dipotassium phosphate or potassium chloride, with or without free amino acids or their salts such as monosodium glutamate, methionine, glycine, alanine and lysine, provides a seasoning composition having an improved and enhanced meatlike flavor. See U.S. Pat. No. 4,066,793 to Eguchi, issued Jan. 3, 1978, which also discloses that the flavor-enhancing effects of 5'-nucleotides tend to increase with an increasing ratio of potassium ions to sodium ions. See also U.S. Pat. No. 3,524,747 to O'Hara et al., issued Aug. 18, 1970, which discloses meat or beef-like seasoning compositions containing amino acids, 5'-nucleotides, potassium phosphates and sugars, and German Pat. No. 1,517,137, issued Mar. 22, 1973, which discloses that 5'-nucleotides of the inosine or guanosine variety improve the seasoning capacity of amino acids when added to foodstuffs and drinks, as well as counteracting unpleasant aftertaste often associated with the amino acids.

However, the salt substitute of the present invention discloses for the first time that 5'-nucleotides, amino acids, potassium phosphates, and sugars can be combined with potassium chloride to provide a substantially sodium-free salt substitute which utilizes less potassium chloride, has a less bitter taste, and has an enhanced salt flavor, as well as additional positive desirable flavor characteristics.

Generally, the salt substitute of the present invention contains no more than 0.5% by weight of sodium. Intentional addition of a source of sodium is avoided. Preferably, whatever sodium is present exists only as a trace contaminant, i.e. less than 0.005% by weight. Because the salt substitute of the present invention is substantially sodium free, it provides a desirable alternative to sodium containing salts for those persons who must restrict their sodium intake.

The salt substitute of the present invention includes as an important ingredient thereof a 5'-nucleotide component. Five prime-nucleotides which are useful herein include the free acids such as inosine 5'-monophosphoric acid (5'-inosinic acid), guanosine 5'-monophosphoric acid (5'-guanosinic acid), adenosine 5'-monophosphoric acid (5'-adenosinic acid), uridine 5'-monophosphoric acid (5'-uridinic acid), cytidine 5'-monophosphoric acid (5'-cytidinic acid) and xanthosine 5'-monophosphoric acid (5'-xanthosinic acid), see U.S. Pat. No. 3,104,171 to Sakaguchi et al., issued Sept. 17, 1963, or physiologically acceptable nonsodium salts of the free acids, such as the alkali metal salts and alkaline earth metal salts other than the sodium salts. As used herein, "physiologically acceptable salts" means those salts whose cations are nondetrimental to animal or human health at an acceptable benefit/risk ratio. The 5'-nucleotide component can comprise the individual acids or the nonsodium salts thereof, or mixtures of the acids and/or nonsodium salts.

The 5'-nucleotide component comprises about 2% to about 6% by weight of the salt substitute. For optimum flavor-enhancing quality, a preferable 5'-nucleotide component comprises about 1% to about 3% by weight of 5'-inosinic acid or its physiologically acceptable nonsodium salt and about 1% to about 3% by weight of 5'-guanosinic acid or its physiologically acceptable nonsodium salt. A particularly preferable 5'-nucleotide component is a mixture of the inosinic and guanosinic acids because of its commercial availability. Typically, the by weight ratio of these acids is 1:1.

Another important ingredient of the salt substitute of the present invention is an amino acid mixture. The source of the amino acid mixture can be artificially produced by mixing together the individual amino acids or by producing the amino acid mixture from a naturally occurring source. Generally, the amino acid mixture should have the flavor-enhancing characteristics of hydrolyzed vegetable protein. Amino acids which can be included in the amino acid mixture are α-alanine, α-aminobutyric acid, arginine, aspartic acid, cysteine glutamic acid, glycine, histidine, hydroxyproline, isoleucine, leucine, lysine:HCl, methionine, ornithine:HCl, phenylalanine, proline, serine, threonine, tyrosine, and valine.

A preferable amino acid mixture is hydrolyzed protein. As used herein, hydrolyzed protein means the mixture of amino acids obtained by hydrolyzing protein. The hydrolyzed protein employed in the salt substitutes of the present invention is preferably obtained by hydrolyzing vegetable protein isolates containing 90% or more by weight protein to obtain a mixture of amino acids. Suitable protein can also be derived from animal protein sources including meat, fish, milk and egg proteins. Because of availability, vegetable protein isolates are preferred. Suitable vegetable proteins include those derived from soybeans, corn, wheat, sorghum, and chick pea. Soy protein isolate and cottonseed protein isolate are especially useful. Especially preferred protein isolates are those containing at least 95% protein.

The protein isolates are hydrolyzed by known methods to obtain a mixture of amino acids. The use of vegetable protein isolates avoids substantial formation of Malliard reaction products and other complex chemical products such as are typically formed in the hydrolysis of protein meals and concentrates. These non-amino acid reaction products have strong, distinct flavors. While some of these reaction products may have desirable flavors, others do not; their presence, therefore, is desirably avoided in the hydrolyzed protein isolates employed in the salt substitute of the present invention.

Hydrolyzed vegetable protein is generally produced by acid hydrolysis and then subsequent neutralization with a base. A particularly preferable hydrolyzed vegetable protein is produced by acid hydrolysis with hydrochloric acid and then subsequent neutralization with potassium hydroxide. The resulting potassium chloride by-product serves as an additional source of this ingredient in the salt substitute.

In addition to the free amino acids, physiologically acceptable salts such as the alkali metal and alkaline earth salts other than the sodium salts can be used in the amino acid mixture. Also, amino acid mixtures derived from other bio-available sources of amino acids besides hydrolyzed protein can be used.

The amino acid mixture generally comprises about 10% to about 40% by weight of the salt substitute. For optimum flavor-enhancing characteristics, the amount of the amino acid mixture is preferably about 24% to about 28% by weight.

Another important ingredient of the salt substitute of the present invention is the sugar component. Suitable sugars alone or in combination include monosaccharides and disaccharides such as fructose, sucrose, glucose, xylose, lactose and maltose. Glucose is a particularly preferable sugar in the salt substitute of the present invention because of its commercial availability. Generally, the sugar component comprises about 5% to about 20% by weight of the salt substitute. For optimum flavor-enhancing characteristics, the sugar component comprises about 8% to about 12% by weight of the salt substitute.

Another important ingredient of the salt substitute of the present invention is the potassium phosphate component which includes monopotassium orthophosphate, or preferably dipotassium orthophosphate, or mixtures thereof. The use of the particular potassium phosphate salt depends on the degree of acidity desired in the final salt substitute composition. Generally, the amount of the potassium phosphate component is about 10% to about 40% by weight of the salt substitute. For optimum flavor-enhancing characteristics, the amount of the potassium phosphate component is preferably about 24% to about 30% by weight.

Another very important ingredient of the salt substitute of the present invention is potassium chloride. It is the potassium chloride which is the primary source of the salty impression. Generally, the amount of potassium chloride is about 15% to about 50% by weight of the salt substitute. For optimum flavor-enhancing characteristics, the amount of potassium chloride is preferably about 30% to about 36% by weight.

The pH of the salt substitute is preferably adjusted such that an aqueous solution containing 20%, by weight, of the salt substitute has a pH from about 5.5 to 7.5. If the salt substitute has a pH lower than 5.5, it presents a sour flavor; if the salt substitute has a pH higher than 7.5, the composition does not present a desirable mouth-watering sensation. The salt substitute preferably has a pH of from about 6.0 to 7.0. If it is desired to adjust the pH, the adjustment is preferably done by the addition of potassium hydroxide or hydrochloric acid in aqueous solution.

Although not wishing to be bound by any theory, it is believed that the ingredients of the salt substitute of the present invention contribute to its flavor as follows. The 5'-nucleotide component, amino acid mixture and sugar component contribute to the mellowing and fullness of flavor of the salt substitute. The potassium phosphate component is believed to moderate the bitterness of the potassium chloride and to contribute to the overall taste sensation of the salt substitute, i.e. provides a mouth-watering, astringent flavor.

Perhaps the most important quality of the above ingredients of the salt substitute is their contribution to the salty impression provided by the potassium chloride. The combination of ingredients appears to enhance the salty impression of the potassium chloride, without the associated bitter flavor, for various foodstuffs. Therefore, the amount of potassium chloride necessary to obtain the saltiness desired is reduced, i.e. is generally no more than 50% by weight of the salt substitute.

The salt substitute of the present invention can be formed by mixing together proper portions of each of the ingredients by conventional mixing techniques. If desirable, the mixture of ingredients can be ground to a particular particle size so as to simulate the physical appearance of ordinary table salt, i.e. sodium chloride. These ingredients can be mixed together to form a blend or added to water to form an aqueous solution of the salt substitute. The aqueous solution can be dried, but, especially in industrial applications can be used as such in food processing (or the manufacture of processed foods).

The salt substitutes of the present invention can be added to a wide variety of foodstuffs in a flavor-enhancing amount. What constitutes a flavor-enhancing amount depends on the particular taste of the user, the particular foodstuff, the particular effect desired, etc. Generally, the amount varies from about 0.5% to about 4% by weight of the particular foodstuff. Usually, the salt substitute is added in an amount of from about 0.5% to about 1% by weight of the foodstuff. The salt substitute of the present invention can be added to any foodstuff where a salty impression is desired, such as soups, mashed potatoes, vegetables, meat, poultry, fish, and the like.

BEST MODE

Example I

The following composition is a suitable salt substitute. The percentages described are by weight.

| Ingredient | Percentage |
| --- | --- |
| 5'- inosinic acid | 1.9% |
| 5'- guanosinic acid | .2% |
| dipotassium orthophosphate | 26.5% |
| glucose | 10.5% |
| potassium chloride | 33.3% |
| hydrolyzed vegetable protein (produced by hydrolyzing with HCl and neutralizing with KOH) | 25.8% |

When added to soup or mashed potatoes, the above salt substitute produces a desirable salty, flavorful impression.

Example II

Testing salt substitute of present invention vs. Morton's Salt Substitute in commercial instant mashed potatoes.

| Compositions | | |
| --- | --- | --- |
| Ingredients | $T_1$ | $T_2$ |
| Water | 364 ml | 364 ml |
| Milk | 120 ml | 120 ml |
| Potato flakes | 86 g | 86 g |
| Butter | 30 g | 30 g |
| *Salt substitute from Example I | 6 g (2g KCl) | — |
| Morton-'s Salt Substitute | — | 4.2g (~4.0g KCl) |
| *Ingredients | | Amount % |
| 5'- inosinic acid | | 1.9 |
| 5'- guanosinic acid | | 2.0 |
| Dipotassium orthophosphate | | 26.5 |
| Glucose | | 10.5 |
| Potassium chloride | | 33.3 |
| **Amino acid mixture | | 25.8 |
| | Total | 100.0 |
| **Alanine | | 4.88 |
| Arginine | | 1.62 |
| Aspartic acid | | 0.68 |
| Cysteine | | 1.71 |
| Glutamic acid | | 6.70 |
| Glycine | | 0.93 |
| Histidine | | 0.73 |
| Isoleucine | | 0.68 |
| Leucine | | 1.86 |
| Lycine | | 0.96 |
| Methionine | | 0.58 |
| Phenylanine | | 1.03 |
| Proline | | 0.28 |
| Serine | | 1.08 |
| Threonine | | 0.35 |
| Tyrosine | | 0.55 |
| Valine | | 1.18 |
| | Total | 25.80 |

The mashed potatoes were prepared according to the directions on the package. The water was brought to a boil. The other ingredients, including the flavorings, were then added and mixed to the desired consistency to provide samples $T_1$ and $T_2$.

The panel was a paired comparison type using twenty untrained panelists.

The samples were served first an equal number of times.

The results of the testing are compiled in the following table.

| | Overall Preference | | |
|---|---|---|---|
| Sample | No. of Panelists | % | Average Rating (1-9 scale) (±.43) |
| $T_1$ | 13 | 65 | 4.45 |
| $T_2$ | 5 | 25 | 3.70 |
| Ties | 2 | | |
| | Salty Taste | | |
| Sample | No. of Panelists | % | Average Rating (1-9 scale) (±.42) |
| $T_1$ | 9 | 45 | 4.25 |
| $T_2$ | 11 | 22 | 4.60 |
| Ties | | | |
| | Off-Flavor | | |
| Sample | No. of Panelists | % | Average Rating (1-9 scale) (±.5) |
| $T_1$ | 3 | 15 | 2.4 |
| $T_2$ | 12 | 60 | 3.75 |
| Ties | 5 | | |

Based on an analysis of the results from the foregoing table, the statistically significant differences between the average ratings of the salt substitute of the present invention ($T_1$) and the Morton's Salt Substitute ($T_2$) were as follows:*

The Morton's Salt Substitute had a significantly higher off-flavor than the salt substitute of the present invention (5% risk level). The salt substitute of the present invention had a higher overall rating in flavor than the Morton's Salt Substitute (10% risk level). No significant differences in salt level between the salt substitute of the present invention and the Morton's Salt Substitute were indicated by the panelists, even though the salt substitute of the present invention contained only about ½ the amount of potassium chloride by weight of Morton's Salt Substitute.

*(The statistical evaluations were made by analysis of variance techniques. The samples were compared by using least significant difference (LSD) criterion. See G. W. Snedecor and W. G. Cochran, *Statistical Methods*, (6th Ed. Iowa State Univ. Press 1967) at pages 277-79 for analysis of variance and pages 271, 272 and 278 for least significant difference.)

Example III

Testing the salt substitute of the present invention vs. Morton's Salt Substitute in an unsalted condensed vegetable beef soup.

| Compositions Ingredients | $T_1$ | $T_2$ |
|---|---|---|
| Vegetable Soup | 1000 g | 1000 g |
| Sugar | 5 g | 5 g |
| Salt substitute of present invention | 7g (2.33g KCl) | — |
| Morton's Salt Substitute | — | 4g (~4gKCl) |

The salt substitute of the present invention and the Morton's Salt Substitute were the same as in Example II.

Samples $T_1$ and $T_2$ were placed in sauce pans, stirred, warmed, and served to the panelists.

The panel was a paired comparison type using twenty untrained panelists.

The samples were served first an equal number of times.

The results of the testing are compiled in the following table:

| | Overall Preference | | |
|---|---|---|---|
| Sample | No. of Panelists | % | Average Rating (1-9 scale) (±.48) |
| $T_1$ | 15 | 75 | 3.3 |
| $T_2$ | 2 | 10 | 1.9 |
| Ties | 3 | | |
| | Salty Taste | | |
| Sample | No. of Panelists | % | Average Rating (1-9 scale) (±.3) |
| $T_1$ | 11 | 55 | 3.0 |
| $T_2$ | 1 | 5 | 1.9 |
| Ties | 8 | | |
| | Off-Flavor | | |
| Sample | No. of Panelists | % | Average Rating (1-9 scale) (±.43) |
| $T_1$ | 3 | 15 | 4.05 |
| $T_2$ | 16 | 80 | 5.7 |
| Ties | 1 | | |

Based on an analysis of the results from the foregoing table, the statistically significant differences between the average ratings of the salt substitute of the present invention and Morton's Salt Substitute were determined to be as follows:

The salt substitute of the present invention was found to be significantly different from the Morton's Salt Substitute in salt level, off-flavor and overall flavor characteristics (5% risk level). The salt substitute of the present invention was found to have significantly less off-flavor (5% risk level). The salt substitute of the present invention was found to have significantly higher overall flavor impression (5% risk level). The salt substitute of the present invention was found to have a significantly higher salt level (5% risk level), even though the salt substitute of the present invention contained only about 3/5 the amount of potassium chloride by weight of Morton's Salt Substitute.

What is claimed is:

1. An edible, substantially sodium-free salt substitute, comprising:
   (a) about 2% to about 6% by weight of a 5'-nucleotide component selected from the group consisting of 5'-nucleotide free acids, physiologically acceptable nonsodium salts of said acids, and mixtures thereof;
   (b) about 10% to about 40% by weight of a potassium phosphate component;
   (c) about 5% to about 20% by weight of a sugar component;
   (d) about 15% to about 50% by weight of potassium chloride; and
   (e) about 10% to about 40% by weight of an amino acid mixture having the flavor-enhancing characteristics of hydrolyzed vegetable protein.

2. A salt substitute according to claim 1 having a pH of about 5.5 to 7.5 when measured in a 20% by weight aqueous solution.

3. A salt substitute according to claim 2 wherein said 5'-nucleotide component is a mixture of about 1% to about 3% by weight of a nonsodium salt of 5'-inosinic acid and about 1% to about 3% by weight of a nonsodium salt of 5'-guanosinic acid, said nonsodium salts being selected from the group consisting of alkali metal salts, and alkaline earth metal salts.

4. A salt substitute according to claim 2 wherein said 5'-nucleotide component is about 1% to about 3% by weight 5'-inosinic acid and about 1% to about 3% by weight 5'-guanosinic acid.

5. A salt substitute according to claim 4 wherein said potassium phosphate component is dipotassium orthophosphate.

6. A salt substitute according to claim 5 wherein said amino acid mixture is hydrolyzed protein.

7. A salt substitute according to claim 6 wherein said hydrolyzed protein is hydrolyzed vegetable protein.

8. A salt substitute according to claim 7 wherein said hydrolyzed vegetable protein is produced by acid hydrolyzing vegetable protein with hydrochloric acid and then neutralizing said acid hydrolyzed vegetable protein with potassium hydroxide.

9. A salt substitute according to claim 7 wherein said sugar component is selected from the group consisting of glucose, fructose, sucrose, xylose and mixtures thereof.

10. A salt substitute according to claim 9 wherein said sugar component is glucose.

11. A salt substitute according to claim 5 wherein said potassium chloride is in an amount of from about 30% to about 36% by weight.

12. A salt substitute according to claim 11 wherein said amino acid mixture is hydrolyzed vegetable protein in an amount of from about 24% to about 28% by weight.

13. A salt substitute according to claim 12 wherein said sugar component is glucose in an amount of from about 8% to about 12% by weight.

14. A salt substitute according to claim 13 wherein said dipotassium orthophosphate is in an amount of from about 24% to about 30% by weight.

15. A foodstuff containing a flavor-enhancing amount of a salt substitute according to claims 1, 2, 3, 4, 5, 6, 7, 8, 9, 10, 11, 12, 13, or 14.

16. An edible, substantially sodium-free salt substitute consisting essentially of:
 (a) about 1% to about 3% by weight of 5'-inosinic acid;
 (b) about 1% to about 3% by weight of 5'-guanosinic acid;
 (c) about 10% to about 40% by weight of dipotassium orthophosphate;
 (d) about 5% to about 20% by weight of glucose;
 (e) about 15% to about 50% by weight of potassium chloride; and
 (f) about 10% to about 40% by weight of an amino acid mixture having the flavor-enhancing characteristics of hydrolyzed vegetable protein, the salt substitute having a pH of about 5.5 to 7.5 when measured in a 20% by weight aqueous solution.

17. A foodstuff containing a flavor-enhancing amount of a salt substitute according to claim 16.

18. A method for enhancing the flavor of a foodstuff, comprising the step of adding a flavor-enhancing amount of a salt substitute according to claims 7, 8, 9, 10, 11, 12, 13 or 14 to the foodstuff.

* * * * *